UNITED STATES PATENT OFFICE.

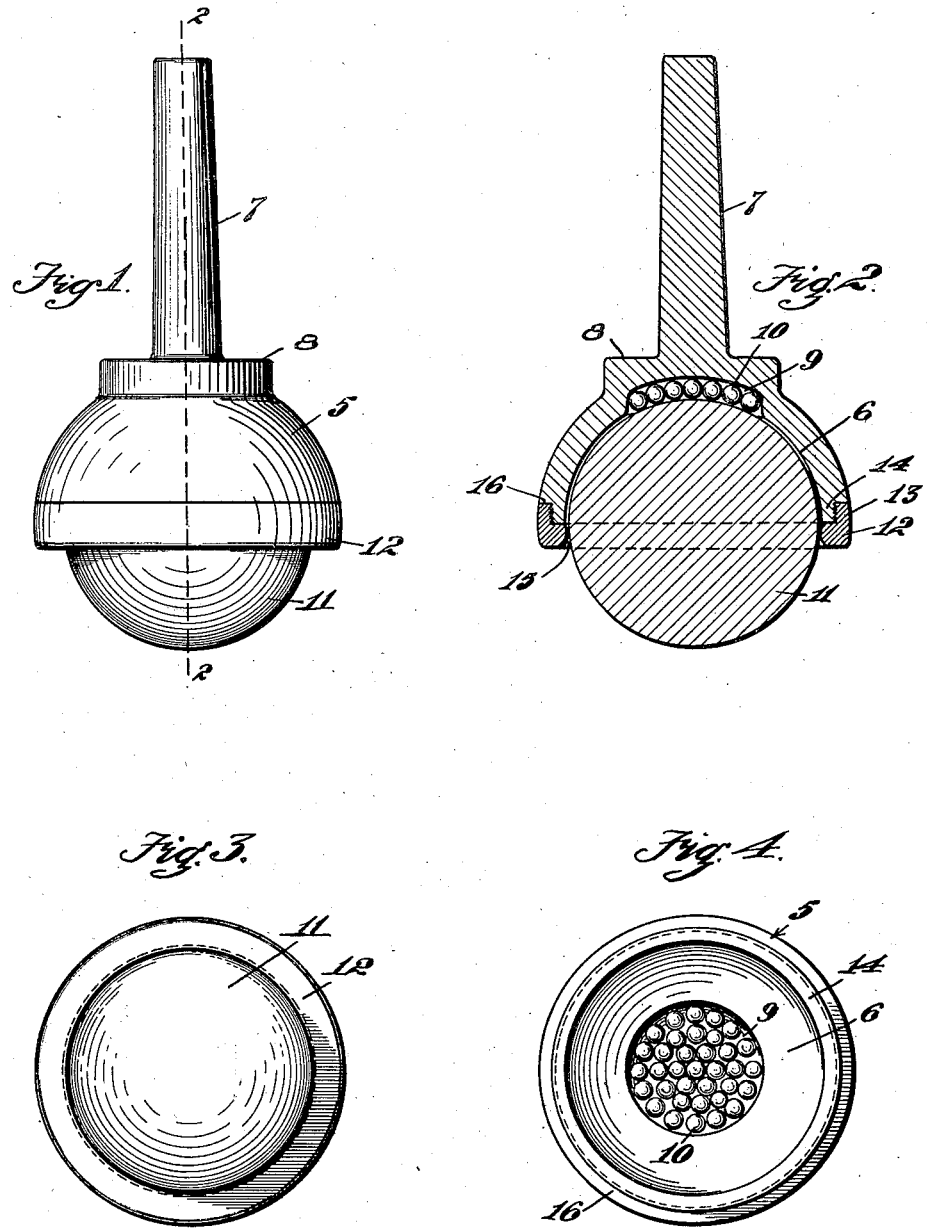

MATHEW D. GRAY, OF BAKERSFIELD, CALIFORNIA.

BALL-BEARING CASTER FOR FURNITURE.

1,139,271.  Specification of Letters Patent.  Patented May 11, 1915.

Application filed December 10, 1913. Serial No. 805,734.

*To all whom it may concern:*

Be it known that I, MATHEW D. GRAY, a citizen of the United States, residing at Bakersfield, in the county of Kern, State of California, have invented new and useful Improvements in Ball-Bearing Casters for Furniture, of which the following is a specification.

This invention relates to ball bearing casters for furniture, and the principal object is to provide a ball bearing caster in which the rotatable caster member comprises a ball arranged to have universal rotary movement and to provide an anti-friction bearing for the ball to facilitate its movement under loads of considerable weight.

Another object is to provide an anti-friction seat for the caster ball embodying a series of small ball bearings, with means for maintaining the caster ball and the ball bearings in their proper operative arrangement with relation to each other.

It is a further object to provide a caster of the above character which is economical in manufacture and durable, and in which the various parts can be readily assembled and taken apart.

The invention primarily resides in a caster ball mounted to have universal rotary movement in a casing, a series of anti-friction balls against which the caster ball seats, and detachable means for retaining the caster ball in the casing against the anti-friction balls.

The invention further consists of the parts and the combination and construction of parts as hereinafter more fully described and claimed, and illustrated in the accompanying drawings, in which, Figure 1 is a view of the caster in side elevation. Fig. 2 is a view in vertical section on the line 2—2 of Fig. 1. Fig. 3 is an end view. Fig. 4 is an end view with the caster ball and retaining ring removed, showing the anti-friction balls in position in the casing.

In the drawings, 5 indicates a casing which may be of any suitable construction, but preferably formed of cast metal; this casing having a hemi-spherical recess 6 on its under side and a centrally disposed stem 7 formed on its upper side. The stem 7 is provided for the purpose of connecting the casing 5 to furniture and other articles, and is adapted to be inserted in a socket provided on the furniture for its reception in the usual well known manner. The shoulder 8 surrounding the base of the stem forms an abutment or support for the furniture or article to which the caster is attached.

Formed in the dome of the recess 6 is a circular depression 9, the bottom wall of which is concentric with the curved wall of the recess 6. The depression 9 is provided for the reception of a series of anti-friction balls 10 which balls are of a diameter slightly greater than the depth of the recess 9 and form an anti-friction seat for a caster ball 11. The caster ball 11 has a diameter slightly smaller than the recess 6 so that when placed within the latter a clearance will be formed between the caster ball 11 and the wall of the recess, and the caster ball will be seated against the anti-friction ball 10. The ball 11 is held in place in the casing 5 by means of a cap or ring 12 having an inside diameter less than the diameter of the ball, which ring is formed with an interiorly threaded upwardly projecting flange 13 on its outer periphery and is adapted to be screwed on an externally threaded depending flange 14 forming the margin of the recess 6. The inner edge of the ring 12 is preferably rounded vertically as indicated at 15 so as to limit the area of contact between the ring and the caster ball 11, and reduce friction at this point to a minimum; the inner peripheral edge of the ring 12 being designed to slidably contact the surface of the caster ball below its axis so as to retain it against the anti-friction balls and centrally of the recess 6 and thereby equalize strains on the anti-friction balls 10 and prevent lateral displacement of the caster ball. The outer periphery of the ring 12 is preferably flush with the outer surface of the casing 5 so as to form a smooth continuous surface when screwed in place and thereby present a neat appearance; the upper edge of the flange 13 abutting against a shoulder 16 formed on the casing 5 at the base of the flange 14.

In assembling the several parts, the casing 5 is inverted and the anti-friction balls 10 placed in the depression 9. The caster ball 11 is then disposed in position in the recess 6 so as to rest on the anti-friction balls 10. The ring 12 is then screwed on the flange 14 with its rounded inner edge 15 contacting the caster ball 11 on the side of its horizontal axis opposite the anti-friction balls 10 thereby securely retaining the caster ball in position as before stated. The caster ball 11 will now be seated against the anti-friction balls 10 which will serve as a bearing for the caster ball and will permit of the easy rotation of the latter in universal direction under considerable pressure.

What I claim is:

A ball-bearing caster, comprising a mounting shank, a casing on said shank formed with a hemispherical recess and having a depression in the dome of the recess, a series of anti-friction balls seated in the depression, a caster ball seated against the anti-friction balls and encompassed to its horizontal axis by the casing, and a retaining ring detachably secured to the casing and encircling the caster ball below its horizontal axis to hold the caster ball in the recess, said retaining ring having a vertically rounded inner periphery to reduce its frictional engagement with the caster ball.

In witness that I claim the foregoing I have hereunto subscribed my name this 22nd day of November, 1913.

MATHEW D. GRAY.

Witnesses:
CARL S. WARREN,
WILLIAM McDONALD.